(12) United States Patent
Baek, IV

(10) Patent No.: US 9,315,328 B2
(45) Date of Patent: Apr. 19, 2016

(54) EXTENDABLE CONVEYOR

(71) Applicant: Anders Stougaard Baek, IV, Aarhus (DK)

(72) Inventor: Anders Stougaard Baek, IV, Aarhus (DK)

(73) Assignee: CALJAN RITE-HITE APS, Hasselager (DK)

( * ) Notice: Subject to any disclaimer, the term of this patent is extended or adjusted under 35 U.S.C. 154(b) by 0 days.

(21) Appl. No.: 14/465,492

(22) Filed: Aug. 21, 2014

(65) Prior Publication Data

US 2015/0060241 A1    Mar. 5, 2015

(30) Foreign Application Priority Data

Aug. 29, 2013    (EP) ..................................... 13004266

(51) Int. Cl.
*B65G 15/26* (2006.01)
*B65G 21/14* (2006.01)

(52) U.S. Cl.
CPC ....................................... *B65G 21/14* (2013.01)

(58) Field of Classification Search
CPC ...................................................... B65G 15/26
USPC ............................... 198/588, 594, 812, 861.1
See application file for complete search history.

(56) References Cited

U.S. PATENT DOCUMENTS 2,721,645 A    10/1955 Eberle
3,835,980 A    9/1974 Brooks, Jr.

(Continued)

FOREIGN PATENT DOCUMENTS

DE    21 08 247    9/1971
EP    1568628    8/2005

(Continued)

OTHER PUBLICATIONS

European Patent Office, "Extended European Search Report," issued in connection with European Patent Application No. 13004266.6, on Jan. 27, 2014 (7 pages).

(Continued)

*Primary Examiner* — Douglas Hess
(74) *Attorney, Agent, or Firm* — Hanley, Flight & Zimmerman, LLC

(57) ABSTRACT

An extendable conveyor disclosed herein includes a base unit including a fixed base unit section positionable onto a ground and a mechanically extendable base unit section. The mechanically extendable base unit is adjustably positionable incrementally between a fully nested position within the fixed base unit section and a fully extended position telescoped forwardly from the fixed base unit section. A mechanically extendable conveyor section is coupled to the mechanically extendable base unit section, where the mechanically extendable conveyor section is adjustably positionable incrementally between a fully nested position within the mechanically extendable base unit section and a fully extended position telescoped forwardly from the mechanically extendable base unit section. A conveying surface to convey articles extends at least partially on an upper side of the fixed base unit section, the mechanically extendable base unit section and the mechanically extendable conveyor section. The mechanically extendable base unit section and the mechanically extendable conveyor section are configured such that extension of the mechanically extendable base unit section from the fixed base unit section is independent of extension of the mechanically extendable conveyor section from the mechanically extendable base unit section.

35 Claims, 9 Drawing Sheets

(56) References Cited

U.S. PATENT DOCUMENTS

| | | | |
|---|---|---|---|
| 4,312,540 A | 1/1982 | Thompson | |
| 4,643,299 A | 2/1987 | Calundan | |
| 5,351,809 A | 10/1994 | Gilmore et al. | |
| 5,423,413 A * | 6/1995 | Gilmore | B65G 13/12 198/594 |
| 5,487,462 A | 1/1996 | Gilmore | |
| 6,006,893 A | 12/1999 | Gilmore et al. | |
| 6,481,563 B1 * | 11/2002 | Gilmore | B65G 67/08 198/511 |
| 6,533,096 B2 | 3/2003 | Gilmore et al. | |
| 7,108,125 B2 * | 9/2006 | Gilmore | A61K 9/0019 198/313 |
| 7,168,555 B2 * | 1/2007 | Peterson | B65G 43/00 198/588 |
| 7,448,486 B1 * | 11/2008 | Frankl | B65G 15/26 198/313 |
| 7,909,153 B2 * | 3/2011 | Pogue | B65G 21/14 198/312 |
| 8,662,291 B2 | 3/2014 | Henderson | |
| 9,045,289 B2 * | 6/2015 | Carpenter | B65G 43/02 |
| 2003/0029694 A1 | 2/2003 | Gilmore | |
| 2004/0112719 A1 | 6/2004 | Gilmore et al. | |

FOREIGN PATENT DOCUMENTS

| | | |
|---|---|---|
| FR | 2 525 570 | 10/1983 |
| FR | 2525247 | 10/1983 |
| WO | 2006068443 | 6/2006 |

OTHER PUBLICATIONS

European Patent Office, "Communication pursuant to Article 94(3) EPC," issued in connection with Application No. 13004266.6, Oct. 16, 2015, 4 pages.

IP Australia, "Notice of Acceptance," issued in connection with Application No. 2014213492, Dec. 23, 2015, 2 pages.

* cited by examiner

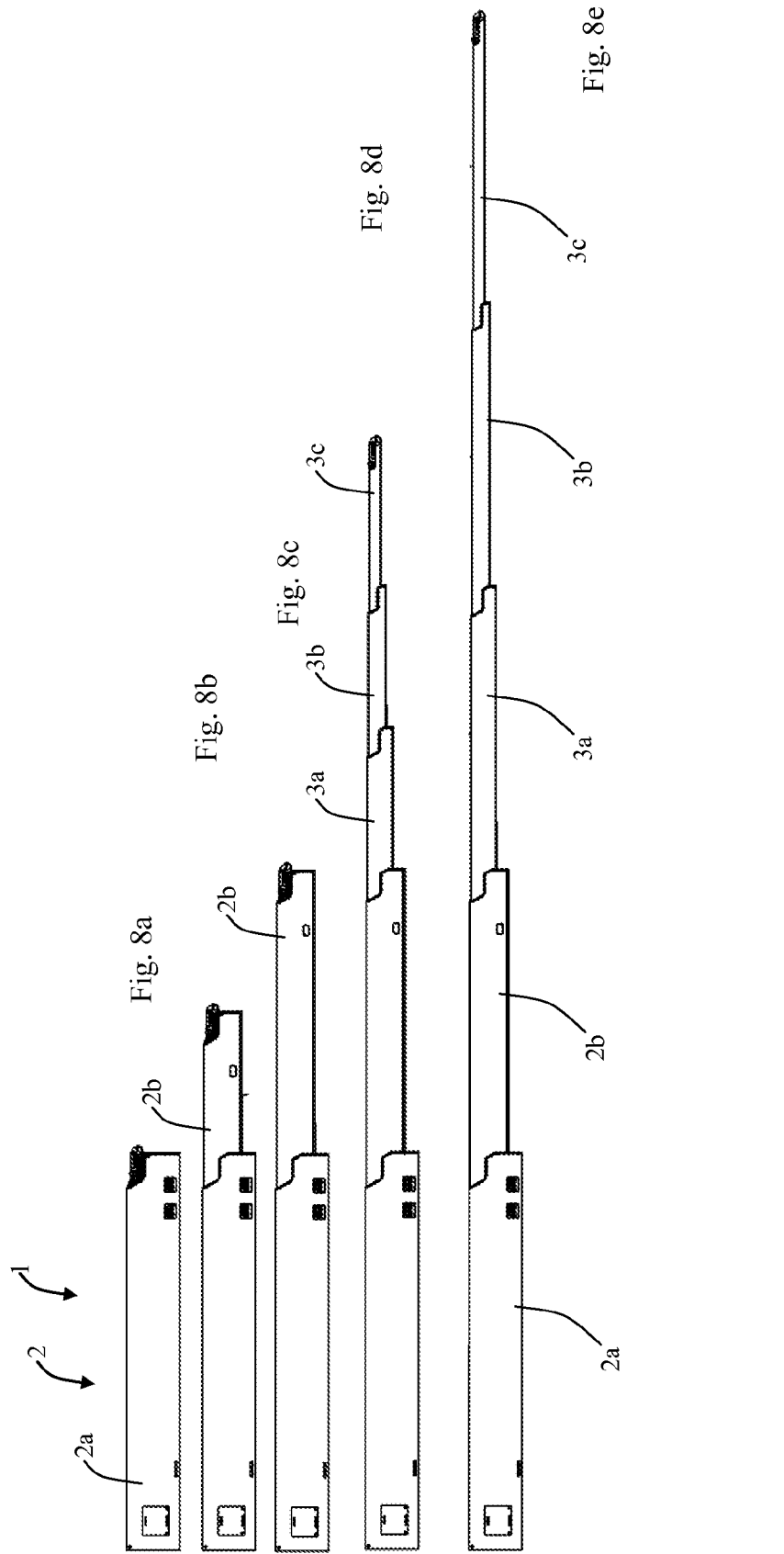

EXTENDABLE CONVEYOR

FIELD OF THE DISCLOSURE

The present disclosure relates generally to conveyors and, more particularly, to extendable conveyors.

BACKGROUND

Extendable conveyors are typically implemented for loading and unloading truck trailers or the like. The extendable conveyor can be extended such that it reaches into a truck or the like, such that personnel can directly put products in the truck onto the conveyor without having to carry to products over long distances.

Extendable conveyors can have two, three, four or five (or even more) extendable units, or extensions, in order to achieve the desired extended length for reaching a forward portion of the truck trailer, while still providing a relatively compact conveyor when it is retracted on the loading dock.

As place in storerooms, where extendable conveyors are typically positioned, is valuable, extendable conveyors should be compact in a retracted state, but should be simultaneous able to bridge long distances to the loading dock and, thus, they should be extendable as long as possible.

However, due to place constraints and due to structural constraints of extendable conveyors the length of an extendable conveyor can not be increased by simply increasing the length or adding a further extendable unit.

SUMMARY

An example extendable conveyor disclosed herein includes a base unit including a fixed base unit section positionable onto a ground and a mechanically extendable base unit section. The mechanically extendable base unit is adjustably positionable incrementally between a fully nested position within the fixed base unit section and a fully extended position telescoped forwardly or away from the fixed base unit section. The conveyor includes a mechanically extendable conveyor section coupled to the mechanically extendable base unit section, where the mechanically extendable conveyor section is adjustably positionable incrementally between a fully nested position within the mechanically extendable base unit section and a fully extended position telescoped forwardly from the mechanically extendable base unit section. The conveyor includes a conveying surface to convey articles extending at least partially on an upper side of the fixed base unit section, the mechanically extendable base unit section and the at least one mechanically extendable conveyor section. The mechanically extendable base unit section and the mechanically extendable conveyor section are configured such that extension of the mechanically extendable base unit section from the fixed base unit section is independent of extension of the mechanically extendable conveyor section from the mechanically extendable base unit section.

Another example extendable conveyor disclosed herein includes a base unit and a mechanically extendable conveyor section coupled to the base unit, where the mechanically extendable conveyor section is adjustably positionable incrementally between a fully nested position within the base unit and a fully extended position telescoped forwardly from the base unit. A conveying surface for conveying articles extends at least partially on an upper side of the base unit and the mechanically extendable conveyor section. The example extendable conveyor includes support structure for supporting the mechanically extendable conveyor section and for receiving cantilever forces exerted to the base unit by the mechanically extendable conveyor section in the fully extended position. The support structure includes a fixed bearing surface for supporting the at least one mechanically extendable conveyor section in the fully extended position and a dynamic bearing for supporting the at least one mechanically extendable conveyor section at positions of the at least one mechanically extendable conveyor section between the fully nested position within the base unit and the fully extended position telescoped forwardly from the base unit.

BRIEF DESCRIPTION OF THE DRAWINGS

FIGS. 8a to 8e illustrates another example extendable conveyor constructed in accordance with the teaching disclosed herein, shown in different example extended states, namely between a fully retracted position, as shown in FIG. 8a and a fully extended position, as shown in FIG. 8e.

DETAILED DESCRIPTION

Figure 1:
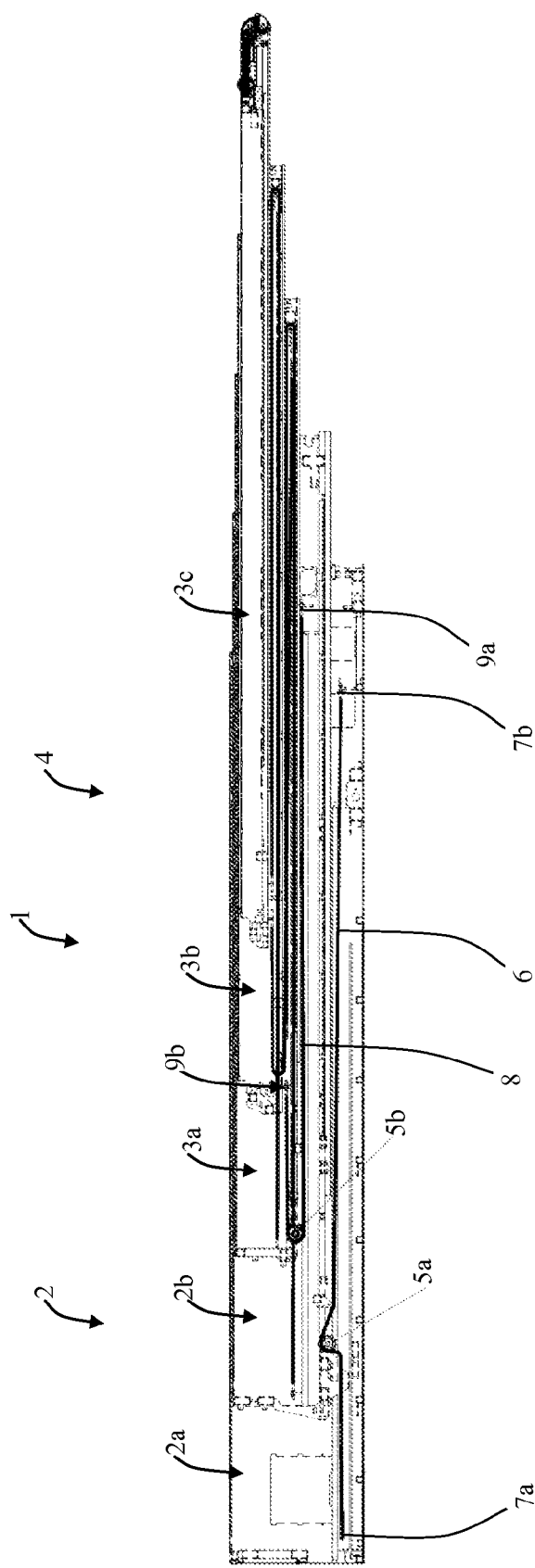
FIG. 1 illustrates an example extendable conveyor constructed in accordance with the teachings disclosed herein.

FIGS. 1 to 8e illustrate an example extendable conveyor 1 in accordance with the teachings disclosed herein.

Extendable conveyors typically have a base unit and multiple extendable conveyor sections which are nested within each other and are retracted and nested in the base unit, such that the extendable conveyor is compact in a fully retracted state. The total length of the extendable conveyor can be adjusted by extending or retracting the nested extendable conveyor sections. The end of the extendable conveyor (e.g., the outmost or last extendable conveyor section), can move, for example, into a truck at a loading dock for loading and/or unloading goods.

Due to place and structural constraints an overall length of an extendable conveyor in a fully extended state cannot be increased in all cases by increasing the length of the conveyor sections or by adding more conveyor sections, since, for example, a width of a conveying surface of last extendable conveyor section might become too small or weight and cantilever forces acting on the base unit might become too large.

In some examples disclosed herein, an extendable conveyor for conveying articles comprises a base unit including a fixed base unit section positionable onto a ground and at least one mechanically extendable base unit section, which is adjustably positionable incrementally between a fully nested position within the fixed base unit section and a fully extended position telescoped forwardly from the fixed base unit section.

The fixed base unit section can be positioned on a ground, can be mounted to the ground or it can be configured to be moveable in its length direction and/or transversely to it.

The mechanically extendable conveyor section(s) is coupled to the mechanically extendable base unit section. The mechanically extendable conveyor section is adjustably positionable incrementally between a fully nested position within the mechanically extendable base unit section and a fully extended position telescoped forwardly from the mechanically extendable base unit section.

A conveying surface for conveying articles extends at least partially on an upper side of the fixed base unit section, the mechanically extendable base unit section and the mechanically extendable conveyor section. The conveying surface can be formed with a belt, rollers, or the like.

The mechanically extendable base unit section and the mechanically extendable conveyor section are configured such that extension of the mechanically extendable base unit section from the fixed base unit section is independent of extension of the mechanically extendable conveyor section from the mechanically extendable base unit section.

As the mechanically extendable base section can be extended independently from the mechanically extendable conveyor section, for example, the mechanically extendable base section can be extended, while the mechanically extendable conveyor section is not extended and vice versa. Thus, in situations where not the full length of the extendable conveyor is need, only the mechanically extendable base section or the mechanically extendable conveyor section can be extended.

The last mechanically extendable conveyor section at the end opposite to the base unit is also referred to as the outmost mechanically extendable conveyor section ("outmost section"). The mechanically extendable conveyor sections between the base unit and the outmost mechanically extendable section are also referred to as intermediate mechanically extendable sections ("intermediate section"). In examples where the extendable conveyor only comprises one mechanically extendable conveyor section, the "intermediate" and the "outmost" mechanically extendable section are the same.

In some examples, the extendable conveyor can include at least two mechanically extendable conveyor sections. One of the at least two mechanically extendable conveyor sections is the outmost mechanically extendable conveyor section, and the remaining mechanically extendable conveyor sections are intermediate mechanically conveyor sections being positioned between the mechanically extendable base unit section and the outmost mechanically extendable conveyor section. The at least two mechanically extendable conveyor sections are extendable independently from the mechanically extendable base unit section.

In some examples, the extension of the mechanically extendable conveyor section(s) can only start after the (e.g., at least one) mechanically extendable base unit section is fully extended and/or nested (e.g., the extension of the mechanically extendable base unit section and the extension of the mechanically extendable conveyor section can be subsequent to each other).

In some examples, the extendable conveyor can include a first drive unit for extending the mechanically extendable base unit section relative to the fixed base unit section and a second drive unit for extending the mechanically extendable conveyor section.

In some examples, the first and second drive units can include a (e.g., an electric) motor drive. The first and second drive units can extend the mechanically extendable base unit section relative to the fixed base unit section and the at least one mechanically extendable conveyor section via, for example, drive chains, wire ropes, (e.g., timing) belts, or the like, which interconnect the sections with each other.

The drive chains or the like of the first drive unit can connect the first drive unit with the mechanically extendable base unit section such that the mechanically base unit section can be extended by driving the first drive unit. In examples with more than one mechanically extendable base unit sections, the mechanically extendable base unit sections are such interconnected that they can also perform a telescopic movement by driving the first drive unit.

In some examples, the drive chains or the like of the second drive unit connect the second drive unit with the mechanically extendable conveyor section such that the mechanically extendable conveyor section can be extended by driving the second drive unit. In the examples with more than one mechanically extendable conveyor sections, the mechanically extendable conveyor sections are such interconnected that they can also perform a telescopic movement by driving the second drive unit.

The example conveyor systems disclosed herein are not limited to a specific inter-connection of the mechanically extendable base unit sections and/or the at least one mechanically extendable conveyor section. The example conveyor systems disclosed herein may be employed with any telescopic moving mechanism of an extendable conveyor and/or other mechanism(s) employed by an extendable conveyor.

Generally, example first and second drive units can be located anywhere in the extendable conveyor. In some examples, the first drive unit is located at the mechanically extendable base unit section and the second drive unit is located at the at least one mechanically extendable conveyor section. In examples with more than one mechanically extendable base unit sections, the first drive unit can be located, for example, in the mechanically extendable base unit section next to the fixed base unit section. In the examples with more than one mechanically extendable conveyor sections, the second drive unit can be located in the mechanically extendable conveyor section next to the mechanically extendable base unit section.

In some examples, more than two drive units are provided and the independent extension of the mechanically extendable base unit section and the at least one mechanically extendable conveyor section can be also provided, for example, between two mechanically extendable base unit sections and/or two mechanically extendable conveyor sections, etc.

In some examples, the fixed base unit section can include a support structure for supporting the mechanically extendable base unit section at least in the fully extended position. Hence, with this support structure the fixed base unit section is structurally reinforced and the mechanically extendable base unit section can transfer forces exerted on it to the support structure, which transfers the forces to the fixed base unit section, which in turn transfers the forces to ground.

In some examples, the support structure can include a fixed bearing surface for supporting the mechanically extendable base unit section in the fully extended position. The fixed bearing surface can be located in an end section of the fixed base unit section, wherein the end section is at the end of the fixed base unit section from which the mechanically extendable base unit section extends. In some examples, the mechanically extendable base unit section touches only the fixed bearing surface, when it is in the fully extended position. In some examples, the mechanically extendable base unit section touches the fixed bearing surface in the case when the at least one mechanically extendable conveyor section is in the fully extended position. As the fixed bearing surface supports the mechanically extendable base unit section, forces, such as weight and cantilever forces, exerted on the mechanically extendable base unit section are received from the fixed bearing surface and are transferred via the fixed base unit section to ground. In some examples, the fixed bearing surface includes an inclined surface and/or it includes a hydraulic member or other actuator which can extend the fixed bearing surface upwardly such that it pushes against the underside of the mechanically extendable base unit section or conveyor section.

In some examples, the support structure includes a dynamic bearing for supporting the mechanically extendable base unit section at positions of the mechanically extendable base unit section between the fully nested position within the fixed base unit section and the fully extended position telescoped forwardly from the fixed base unit section. Hence, in some examples the dynamic bearing supports the mechanically extendable base unit section as long as the mechanically extendable base unit section and/or the at least one mechanically extendable conveyor section is/are not in its fully extended position. If the mechanically extendable base unit section and/or the at least one mechanically extendable conveyor section is/are in its fully extended position, the mechanically extendable base unit section may be supported by the fixed bearing surface.

In some examples, the dynamic bearing provides a supporting function during movement of the mechanically extendable base unit section. When the mechanically extendable base unit section is in its fully extended position and/or the at least one mechanically extendable conveyor section is in its fully extended position, the mechanically extendable base unit section may be supported by the fixed bearing surface mentioned above.

The dynamic bearing can be located adjacent to the fixed bearing surface, such that it supports the mechanically extendable base unit section in an area where also the fixed bearing surface supports the mechanically extendable base unit section.

In some examples, the support structure is such configured in some embodiments that the dynamic bearing can be moved from a supporting position to a rest position. The movement of the dynamic bearing from a supporting position to a rest position can be performed actively, e.g. by a drive unit, or it can be performed passively.

In some examples, the dynamic bearing is in the rest position, when the at least one mechanically extendable conveyor section is in the fully extended position.

In some examples, the mechanically extendable base unit section can be supported by the fixed bearing surface, when the dynamic bearing is in the rest position. As long as the dynamic bearing is in the supporting position, it can lift the mechanically extendable base unit section such that the mechanically extendable base unit section does not touch the fixed bearing surface.

In some examples, the drive unit for actively moving the dynamic bearing can be an electric motor which mechanically moves the dynamic bearing from its supporting position to its rest position, it can be a hydraulic mechanism which lowers (e.g. the dynamic bearing from it supporting position to its rest position), and/or an electric drive and a hydraulic mechanism, etc.

The drive unit for actively moving the dynamic bearing between a supporting position and a rest position can be triggered by a switch which is actuated when the mechanically extendable base unit section and/or the at least one mechanically extendable conveyor section are in a certain position, such as the fully extended position.

Similarly, in the examples where the dynamic bearing is passively moved from the supporting position to the rest position, the movement can be triggered by a mechanical switch which releases a mechanical mechanism, such that the dynamic bearing can move from the supporting position to the rest position.

In some examples, the dynamic bearing is spring-loaded. In other examples, the dynamic bearing can also exert the supporting function with a hydraulic member. The dynamic bearing can be configured to move from the supporting position to the rest position in the case that a force, such as a weight and cantilever forces, exceeds a predefined limit and/or exceeds the support force exerted by the spring and/or hydraulic member, such that the dynamic bearing is lowered to its rest position. In some embodiments, the spring-load exerts a tension force such that the dynamic bearing exerts its supporting function, while in other embodiments the spring-load exerts a pressure force, or a combination of tension and pressure force.

In some examples, the dynamic bearing includes at least one support wheel, such that the support wheel revolves with the movement of the mechanically extendable base unit section. In some examples, the dynamic bearing can include multiple wheels, such as two or more.

In some examples, the fixed base unit section comprises a first anchor structure and the mechanically extendable base unit section comprises a second anchor structure. The first and second anchor structures engage each other when the mechanically extendable base unit section is in a fully extended position and the first and second anchor structures receive cantilever forces exerted by the extended mechanically extendable conveyor sections, such that such cantilever forces can be transferred to ground via the fixed base unit section.

Moreover, in some examples, the first and second anchor structures are configured such that they exert a force in a downward direction such that the second anchor structure is pulled downwardly. Thereby, the mechanically extendable base unit/conveyor section to which the second anchor structure is mounted can be lowered to some extent. In some examples, a tolerance of the overall mechanics for bearing and moving the mechanically extendable base unit/conveyor section allows a certain lowering of the mechanically extendable base unit/conveyor section to which the second anchor structure is mounted. Hence, in some examples, (guide) bearings or the like which are mounted to the mechanically extendable base unit/conveyor section are also lowered, which can reduce a load acting on such bearings, in particular loads generated, for example, by cantilever forces of the extended mechanically extendable conveyor sections. In some examples, the downward force is exerted on a rearward end of the mechanically extendable base unit section after the engagement of the first and second anchor structures. Thereby at least some of the cantilever forces exerted on the bearings can be relieved.

In some examples, the first anchor structure performs a downward movement that is transferred to the second anchor structure, when the mechanically extendable base unit section moves a last small distance into its fully extended position. The small distance can be some millimeters. As mentioned, this downward movement of the first anchor structure transferred to the second anchor structure can cause the lowering of bearings which thereby reduces a load acting on such bearings, in particular loads generated, for example, by cantilever forces of the extended mechanically extendable conveyor sections. Additionally, in some examples the second anchor structure is connected to such a bearing and this connection can be stiff in some examples.

The first and the second anchor structure can define a rotation axis, when engaging each other. The first and second anchor structures receive cantilever forces exerted by the extended mechanically extendable conveyor sections. The first and second anchor structures can receive lifting forces, which are exerted by the mechanically extendable base unit section.

In some examples, the first anchor structure has a bolt-shaped portion and the second anchor structure can have a hook-shaped portion.

In other examples, the first and second anchor structures include a wedge shaped portion or the like. Moreover, the first anchor structure can be formed by any mechanical part which can hold the second anchor structure in place and can receive and withstand forces acting in an upward direction such that the first and second anchor structures being engaged into each other prohibit a lift of the second anchor structure and, thus, prohibit a lift of the mechanically extendable base unit section or the mechanically extendable conveyor section to which the second anchor structure is mounted. The first anchor structure can also include at least one or more wheels. It can also include at least one hydraulic member or other actuator which can exert a force in a downward direction when the second anchor structure engages the first anchor structure.

The cantilever forces can be distributed between the fixed bearing surface and the first and/or second anchor structure. Hence, in some examples the fixed bearing surface (together with the dynamic bearing) can be remotely located with respect to the first anchor structure of the fixed base unit section, such that the first anchor structure and the fixed bearing surface define at least two support points.

In some examples, the first and second anchor structures receive lifting forces exerted by the mechanically extendable base unit section which basically show in an upward direction and the fixed bearing surface receives forces which basically show in a downward direction. Hence, the combination of the first and second anchors structures with the fixed bearing surface prohibits that the mechanically extendable base unit section can rotate about an axis which is horizontal and perpendicular to the length axis of the mechanically extendable base unit section.

In some examples, the extendable conveyor comprises a control adapted to control the extendable conveyor such that the full extension of the mechanically extendable base unit section precedes the extension of the at least one mechanically extendable conveyor section from the mechanically extendable base unit section. The control is, for example, adapted to accordingly drive the first and second drive units discussed above and it can include a microprocessor or the like.

In some examples, the above discussed support structure is further provided in the mechanically extendable base unit section and/or in at least one of the mechanically extendable conveyor sections. For instance, the support structure can be located in the mechanically extendable base unit section or in the adjacent mechanically extendable conveyor section, etc.

In some examples, the first and second anchor structures are provided in the mechanically extendable base unit section and the adjacent mechanically extendable conveyor section and/or in at least two adjacent mechanically extendable conveyor sections. For example, the first anchor structure is provided in the mechanically extendable base unit section and the second anchor structure is provided in the adjacent mechanically extendable conveyor section, etc.

In some examples, each of the mechanically extendable base unit section and the adjacent mechanically extendable conveyor section and/or the at least two adjacent mechanically extendable conveyor sections, where the support structure and/or the first and second anchor structure is provided, includes a drive unit. Hence, in some examples, each mechanically extendable base unit/conveyor section which includes a respective support structure and/or first/second anchor structure includes its own drive unit and can be driven separately, i.e. independent from other mechanically extendable conveyor sections. Thereby, each mechanically extendable base unit/conveyor section can be supported by the support structure and/or anchored by the first and second anchor structures, as discussed above, such that the cantilever forces exerted by the mechanically extendable conveyor sections are distributed over the support and/or first/second anchor structures to the base unit section.

Alternative examples, which do not necessarily have the above-discussed functionality of independent extension of the mechanically extendable base unit section and the mechanically extendable conveyor sections, but which can have at least partially the above discussed functionalities for reaction of cantilever forces for an extendable member, pertain to the following examples:

An example conveyor apparatus disclosed herein comprises a base unit and a mechanically extendable member coupled to the base unit, where the mechanically extendable member is adjustably positionable incrementally between a fully nested position within the base unit and a fully extended position moved forwardly from the base unit. The example conveyor includes a support structure for supporting the mechanically extendable member and for receiving cantilever forces exerted to the base unit by mechanically extendable member in the fully extended position, where the support structure includes a fixed bearing surface for supporting the mechanically extendable member in the fully extended position and a dynamic bearing for supporting the mechanically extendable member at positions of the mechanically extendable member between the fully nested position within the base unit and the fully extended position moved forwardly from the base unit.

An example extendable conveyor for conveying articles disclosed herein comprises a base unit and a mechanically extendable conveyor section coupled to the base unit. The mechanically extendable conveyor section is adjustably positionable incrementally between a fully nested position within the base unit and a fully extended position telescoped forwardly from the base unit.

An example conveyor disclosed herein includes a conveying surface for conveying articles, which extends at least partially on an upper side of the base unit and the mechanically extendable conveyor section.

In some examples, the extendable conveyor comprises a support structure for supporting the at least one mechanically extendable conveyor section and for receiving cantilever forces exerted to the base unit by the mechanically extendable conveyor section when in the fully extended position. The support structure includes a fixed bearing surface for supporting the mechanically extendable conveyor section in the fully extended position and a dynamic bearing for supporting the mechanically extendable conveyor section at positions of the mechanically extendable conveyor section between the fully nested position within the base unit and the fully extended position telescoped forwardly from the base unit.

In some examples, the extendable conveyor has a drive unit for performing the telescopic movement of the at least one mechanically extendable conveyor section, and the drive unit can comprise a (e.g., an electric) motor drive. The drive unit can move the mechanically extendable conveyor section relative to the base unit. The mechanically extendable conveyor section is connected via, for example, drive chains, wire ropes, (timing) belts, or the like, with the drive unit and in the case of multiple mechanically extendable conveyor sections, they are interconnected thereby with each other such that they can perform a telescopic extension. As mentioned, the telescopic movement mechanism of an extendable conveyor is generally known, such it is not necessary to describe it in more detail herein.

The support structure structurally reinforces the base unit and the mechanically extendable conveyor section, which is next to the base unit, can transfer forces exerted on it to the support structure, which transfers the forces to the base unit which in turn transfers the forces to ground.

In some examples, the fixed bearing surface is located in an end section of the base unit, wherein the end section is at the end of the base unit from which the mechanically extendable conveyor section extends. The mechanically extendable conveyor section may touch only the fixed bearing surface, when it is in the fully extended position. As the fixed bearing surface supports the mechanically extendable conveyor section, forces, such as weight and cantilever forces, exerted on the mechanically extendable conveyor section are received from the fixed bearing surface and are transferred via the base unit to the ground.

In some examples, the dynamic bearing supports the mechanically extendable conveyor section (next to the base unit) as long as the mechanically extendable conveyor section is not in the fully extended position. If at least one and/or all mechanically extendable conveyor sections are in the fully extended position, the mechanically extendable conveyor section which is next to the base unit may be supported by the fixed bearing surface.

In some examples, the dynamic bearing provides a supporting function during movement of the (e.g., at least one) mechanically extendable conveyor section (next to the base unit). When the mechanically extendable conveyor section is in the fully extended position, the mechanically extendable conveyor section may be supported by the fixed bearing surface.

The dynamic bearing can be located adjacent to the fixed bearing surface, such that it supports the mechanically extendable conveyor section (e.g., next to the base unit) in an area where also the fixed bearing surface supports the mechanically extendable conveyor section.

The support structure is such configured in some examples that the dynamic bearing can be moved from a supporting position to a rest position. The movement of the dynamic bearing from a supporting position to a rest position can be performed actively, for example, by a drive unit, and/or it can be performed passively.

In some examples, the dynamic bearing is in the rest position, when the mechanically extendable conveyor section is in the fully extended position.

In some examples, the mechanically extendable conveyor section (e.g., next to the base unit) can be supported by the fixed bearing surface, when the dynamic bearing is in the rest position. As long as the dynamic bearing is in the supporting position, it can lift the mechanically extendable conveyor section such that the mechanically extendable conveyor section does not touch the fixed bearing surface.

The drive unit for actively moving the dynamic bearing can be an electric motor which mechanically moves the dynamic bearing from the supporting position to the rest position, it can be a hydraulic mechanism which lowers, for example, the dynamic bearing from it supporting position to its rest position, and/or it can be a mixture of an electric drive and a hydraulic mechanism, etc.

The drive unit for actively moving the dynamic bearing between the supporting position and the rest position can be triggered by a switch which is actuated when the mechanically extendable conveyor section next to the base unit and/or any other of the mechanically extendable conveyor sections is in a certain position, such as the fully extended position.

Similarly, in examples where the dynamic bearing is passively moved from the supporting position to the rest position, the movement can be triggered by a mechanical switch which releases a mechanical mechanism, such that the dynamic bearing can move from the supporting position to the rest position.

In some examples, the dynamic bearing is spring-loaded. In other examples, the dynamic bearing can also exert its supporting function with a hydraulic member. The dynamic bearing can be configured that it moves from the supporting position to the rest position in the case that a force, such as a weight and cantilever forces, exceeds a predefined limit and/or exceeds the support force exerted by the spring and/or hydraulic member, such that the dynamic bearing is lowered to the rest position. In some examples, the spring-load exerts a tension force such that the dynamic bearing exerts the supporting function, while in other examples the spring-load exerts a pressure force, and/or a combination of tension and pressure force.

In some examples, the dynamic bearing includes at least one support wheel, such that the support wheel revolves with the movement of the mechanically extendable conveyor section (next to the base unit). In some examples, the dynamic bearing can include multiple wheels, such as two or more.

In some examples, the base unit comprises a first anchor structure and the mechanically extendable conveyor section (e.g., next to the base unit) comprises a second anchor structure. The first and second anchor structures engage each other when the mechanically extendable conveyor section is in the fully extended position and the first and second anchor structures receive cantilever forces exerted by the extended mechanically extendable conveyor section.

Moreover, in some examples, the first and second anchor structures are such configured that they exert a force in a downward direction such that the second anchor structure is pulled downwardly. Thereby, the mechanically extendable base unit/conveyor section to which the second anchor structure is mounted can be lowered to some extent. In some examples, a tolerance of the overall mechanics for bearing and moving the mechanically extendable base unit/conveyor section allows a certain lowering of the mechanically extendable base unit/conveyor section to which the second anchor structure is mounted. Hence, in some examples, (guide) bearings or the like which are mounted to the mechanically extendable base unit/conveyor section are also lowered, which can reduce a load acting on such bearings, in particular loads generated, for example, by cantilever forces of the extended mechanically extendable conveyor sections. In some examples, the downward force is exerted on a rearward end of the mechanically extendable base unit/conveyor section after the engagement of the first and second anchor structures. Thereby at least some of the cantilever forces exerted on the bearings can be relieved.

In some examples, the first anchor structure performs a downward movement that is transferred to the second anchor structure, when the mechanically conveyor section moves a last small distance into the fully extended position. The small distance can be a few millimeters. As mentioned, this downward movement of the first anchor structure transferred to the second anchor structure can cause the lowering of bearings which thereby reduces a load acting on such bearings, in particular loads generated, for example, by cantilever forces of the extended mechanically extendable conveyor sections. Additionally, in some examples the second anchor structure is connected to such a bearing and this connection can be stiff in some examples.

In some examples, the first and the second anchor structure define a rotation axis, when engaging each other. The first and second anchor structure receive cantilever forces exerted by the extended at least one mechanically extendable conveyor section. The first and second anchor structures can receive lifting forces, which are exerted by the at least one mechanically extendable conveyor section.

The first anchor structure can have a bolt-shaped portion and the second anchor structure can have a hook-shaped portion.

The first and second anchor structures can also include a wedge shaped portion or the like. Moreover, the first anchor structure can be formed by any mechanical part which can hold the second anchor structure in place and can receive and withstand forces acting in an upward direction, such that the first and second anchor structures being engaged into each other prohibit a lift of the second anchor structure and, thus, prohibit a lift of the mechanically extendable conveyor section to which the second anchor structure is mounted. The first anchor structure can also include at least one or more wheels. It can also include at least one hydraulic member or other actuator which can exert a force in a downward direction when the second anchor structure engages the first anchor structure.

The cantilever forces can be distributed between the fixed bearing surface and the first and/or second anchor structure. Hence, in some examples the fixed bearing surface (together with the dynamic bearing) can be remotely located with respect to the first anchor structure of the base unit, such that the first anchor structure and the fixed bearing surface define at least two support points. In some examples, the first and second anchor structures receive lifting forces exerted by the at least one mechanically extendable conveyor section which basically show in an upward direction and the fixed bearing surface receives forces which basically show in a downward direction. Hence, the combination of the first and second anchors structures with the fixed bearing surface prohibits that the mechanically extendable conveyor section (next to the base unit) can rotate about an axis which is horizontal and perpendicular to the length axis of the mechanically extendable conveyor section (next to the base unit).

In some examples, the above discussed support structure is further provided in at least one of the mechanically extendable conveyor sections.

In some examples, the first and second anchor structures are provided in at least two adjacent mechanically extendable conveyor sections. For example, the first anchor structure is provided in a first mechanically extendable conveyor section and the second anchor structure is provided in a second the mechanically extendable conveyor section, etc.

In some examples, each of the at least two adjacent mechanically extendable conveyor sections, where the support structure and/or the first and second anchor structure is provided, includes a drive unit. Hence, in some examples, each mechanically extendable conveyor section which includes a respective support structure and/or first/second anchor structure includes its own drive unit and can be driven separately, i.e. independent from other mechanically extendable conveyor sections. Thereby, each mechanically extendable conveyor section can be supported by the support structure and/or anchored by the first and second anchor structures, as discussed above, such that the cantilever forces exerted by the mechanically extendable conveyor sections are distributed over the support and/or first/second anchor structures to the base unit.

Returning to FIGS. 1 to 8e, there is illustrated examples of an extendable conveyor 1 in accordance with the teachings disclosed herein.

The extendable conveyor 1 has a base unit 2 and three mechanically extendable conveyor sections 3a-c (see FIG. 1).

The base unit 2 is sectioned into a fixed base unit section 2a and a mechanically extendable base unit section 2b. The three extendable conveyor sections 3a-c are nested within each other in the extendable base unit section 2b which in turn is nested within the fixed base unit section 2a. Hence, the extendable base unit section 2b and the three extendable conveyor sections 3a-c can be nearly fully nested in the fixed base unit section 2a when they are all fully retracted (see FIG. 1, FIG. 3, and FIG. 8a).

The fixed base unit section 2a, the extendable base unit section 2b and the three extendable conveyor sections 3a-c form a conveying surface 4 for conveying articles.

The fixed base unit section 2a can be anchored to floor or it can be moveable, as mentioned above.

As discussed, the extendable base unit section 2b can be extended independently from the extendable conveyor sections 3a-3c, which are interconnected in a telescopic manner.

Figure 2:
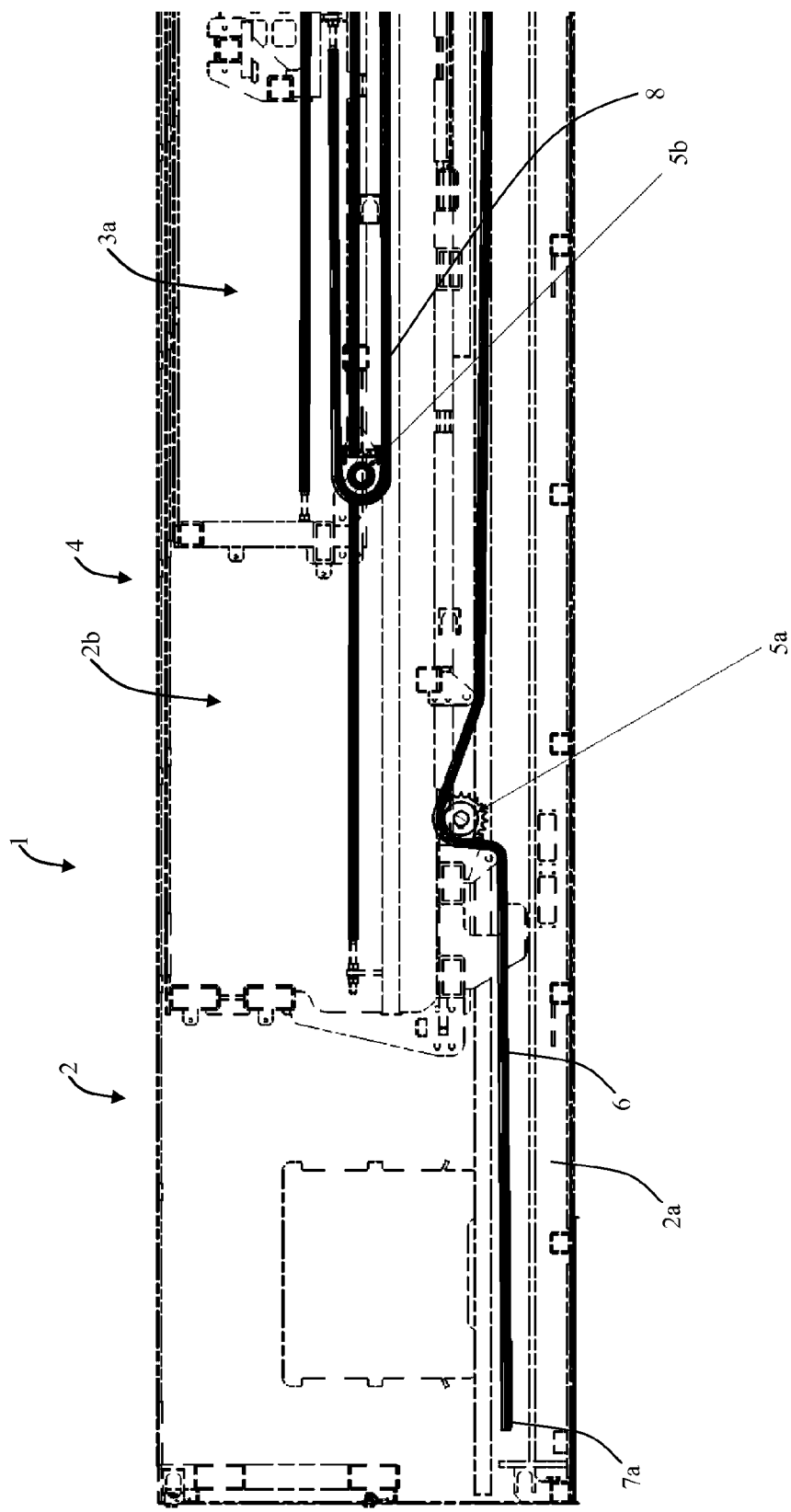
FIG. 2 illustrates an enlarged partial view of the example extendable conveyor of FIG. 1.
Figure 3:
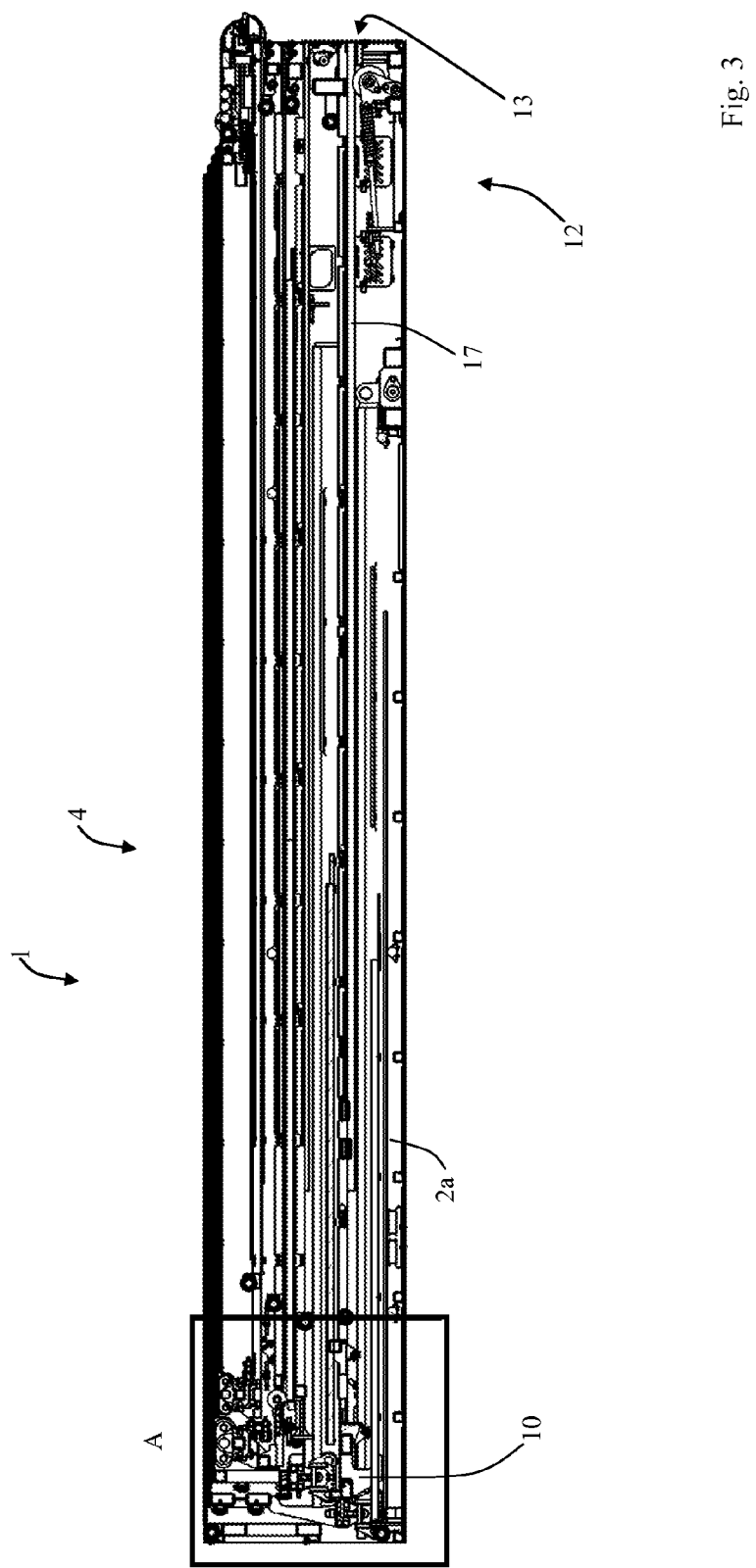
FIG. 3 illustrates a section view of the example extendable conveyor of FIG. 1.
Figure 4:
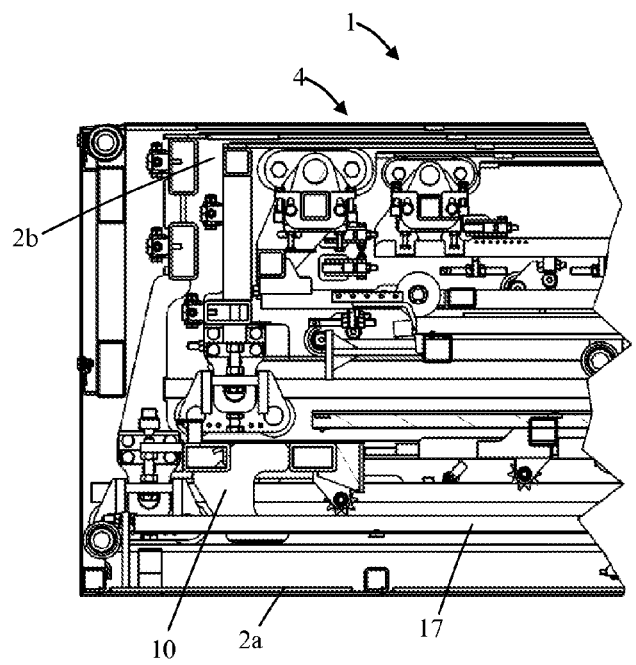
FIG. 4 is an enlarged view of an area A shown in FIG. 3.

For extending the extendable base unit section 2b, a first motor drive 5a is provided, which is located below the extendable base unit section 2b and it is located in an end portion of the extendable base unit section 2b which is on the opposite side of the end where the extendable conveyor sections 3a-c extend from the extendable base unit section (i.e. on the left side in FIGS. 1 and 2).

In the following, an end of the fixed base unit section 2a, the extendable base unit section 2b and one of the extendable conveyor sections 3a-c, which is at the rearward end where no section extends, will be referred to as "rearward end", while the opposite end, where the sections extend, will be referred to as "forward end".

The first motor drive 5a drives a chain 6, which has two anchor points in the fixed base unit section 2a, namely a first anchor point 7a, basically in a rearward end portion of the fixed base unit section 2a next to the motor drive 5a and a second anchor point 7b at the opposite forward end of the fixed base unit section 2a. The first motor drive 5a engages with the chain 6 and, as chain 6 is fixed at the first 7a and second 2b anchor points to the fixed base unit section 2a, the first motor drive 5a travels along chain 6 forwards and backwards when it is driven accordingly. Thereby, motor drive 5a extends the mechanically extendable base unit section 2b together with the extendable conveyor sections mounted to it, but without extending the extendable conveyor sections 3a-c.

A second motor drive 5b is located at the first extendable conveyor section 3a which is next to the extendable base unit section 2b. The second motor drive 5b is located in a rearward end portion of the first extendable conveyor section 3a (left side in FIGS. 1 and 2) and engages a chain 8. Chain 8 is anchored at a first anchor point 9a located at a forward end of the extendable base unit section 2b and it is anchored at a second anchor point 9b located at a rearward end of the second extendable conveyor section 3b next to the first extendable section 3a. The remaining extendable sections 3b and 3c are similarly interconnected to each other which chains, such that they perform a telescopic movement(e.g., see for example, EP 1 568 627 B1, which is incorporated herein by reference).

By driving the second motor drive 5b, the chain 8 is pulled either such that it pulls at anchor point 9a or at anchor point 9b—depending on the rotation direction of motor drive 5b. As all extendable conveyor sections 3a-c are connected to each other, the extendable conveyor sections are extended or retracted in a telescopic manner. Pulling at anchor point 9a extends the telescope conveyor formed by the extendable conveyor sections 3a-c and pulling at anchor point 9b retracts the telescope conveyor formed by the extendable conveyor sections 3a-c.

The extendable base unit section 2b has a hook-shaped anchor 10 mounted below its rearward end, which can engage into a bolt-shaped anchor 11, which is mounted at the fixed base unit section 2a, when the extendable base unit section 2b is in its fully extended position (see FIGS. 3 to 6).

When the extendable base unit section 2b is in the fully retracted position (FIGS. 3 and 4), the hook 10 is located at the rearward end of the fixed base unit section 2a. By extending the extendable base unit section 2b by driving the first motor drive 5a, the hook 10 is moved in the forward direction and when the extendable base unit section 2b is in the fully extended position the hook 10 engages the bolt 11. Bolt 11 is spring loaded and can pivot about a pivot axis 19 mounted to the bottom of the fixed base unit section 2a, such that the hook 10 can push the bolt 11 in a forward direction when engaging it.

During movement of the extendable base unit section 2b a dynamic bearing 12 located at the forward end of the fixed base unit section 2a supports the extendable base unit section 2b. When the extendable base unit section 2b is in the fully extended position, it gets into contact with a fixed bearing surface 13 also referred to as "a landing pad", since the dynamic bearing 12 is moved from the supporting position to a rest position, where it is such lowered that the extendable base unit section 2b rests on the fixed bearing surface 13.

The dynamic bearing 12 has a wheel 14 which is spring loaded with a spring 15. As discussed above, in some examples instead of and/or in addition to spring 15 one or more hydraulic cylinders can be provided. The spring 15 is fixed to a bar 18 which in turn is mounted to a holder 20, wherein the holder 20 is mounted to the bottom of the fixed base unit section 2a. The spring 15 is mounted to a bolt 21 of a wheel holder 22 and the spring 15 stay under tension such that it pulls at the bolt 21. The wheel holder 22 is mounted to the bottom of the fixed base unit 2b such it can pivot around an axis 16, thereby forcing wheel 14 upwardly. Due the tension force exerted by the spring 15, the wheel 14 pushes against a bar 17 which is mounted to the bottom of the extendable base unit section 2b. The wheel 14 revolves on bar 17 when the extendable base unit section 2b is moved, i.e. extended or retracted.

The fixed bearing surface 13 is also mounted to the bottom of the fixed base unit section 2a and bar 17 of the extendable base unit section 2b can "land" on it such that the fixed bearing surface 13 receives forces in a downward direction exerted by the extendable base unit section 2b.

The spring-load exerted by spring 15 of the dynamic bearing 12 is configured such that the extendable base unit section 2b comes in touch with the bearing surface 13, when it is in the fully extended position and/or when the extendable conveyor sections are extended, (e.g. partially and/or to their fully extended position), since the exerted downward force exceeds the spring-load. When the extendable base unit section 2b is in the fully extended position, hook 10 engages bolt 11, such that the hook 10 and thus the extendable base unit section 2b cannot be lifted by a cantilever force exerted by the extended extendable base unit section 2b and the (e.g., extended) extendable conveyor sections 3a-c. Simultaneously, the extendable conveyor section 2b is pushed by the weight and cantilever forces exerted by the extended extendable base unit section 2b and the (e.g., extended) extendable conveyor sections 3a-c onto the fixed bearing surface 13. Hence the extendable base unit section 2b is secured by the hook 10 and bolt 11 and by resting onto the fixed bearing surface 13.

Figure 5:
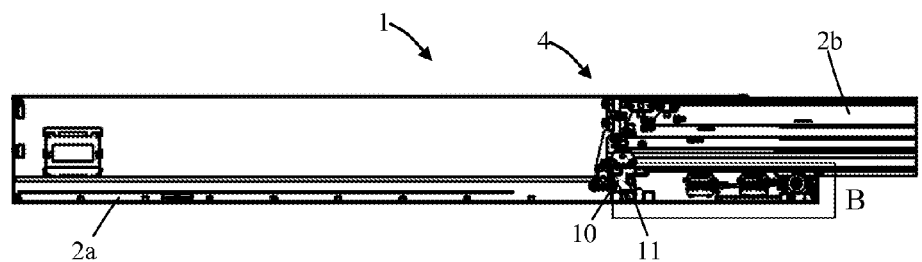
FIG. 5 illustrates another example extendable conveyor in an extended position that is constructed in accordance with the teachings disclosed herein.
Figure 6:
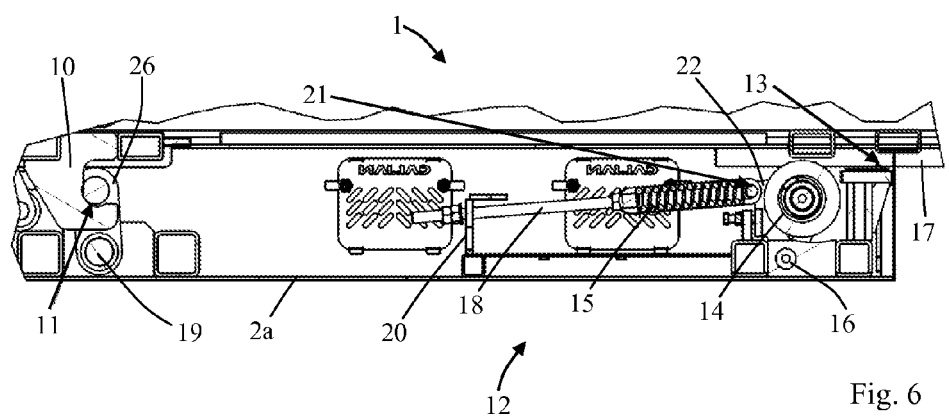
FIG. 6 is an enlarged view of an area B shown in FIG. 5.
Figure 7A:
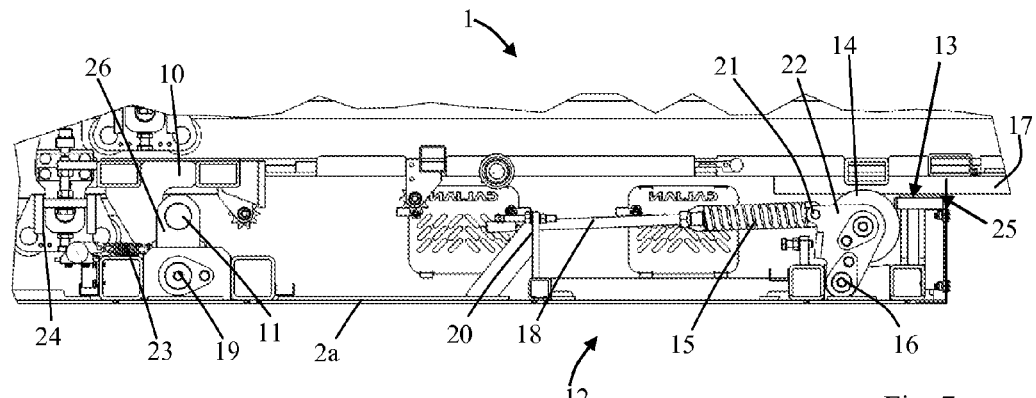
FIG. 7a illustrates the area B shown in FIG. 5, in a further sectional and enlarged view, where an example mechanically extendable base unit section of the example extendable conveyor of FIG. 5 is adjacent a fully extended position.
Figure 7B:
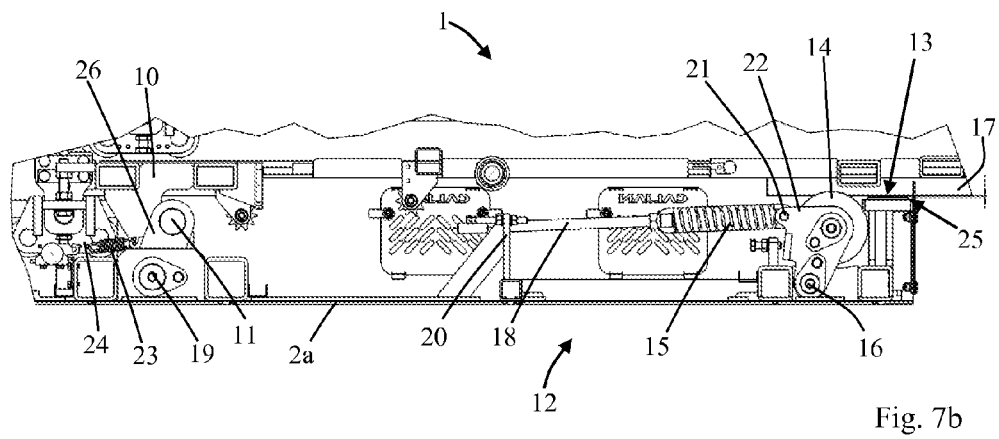
FIG. 7b illustrates the area B shown in FIG. 5, in a further sectional and enlarged view showing the example mechanically extendable base unit section approaching the fully extended position.
Figure 7C:
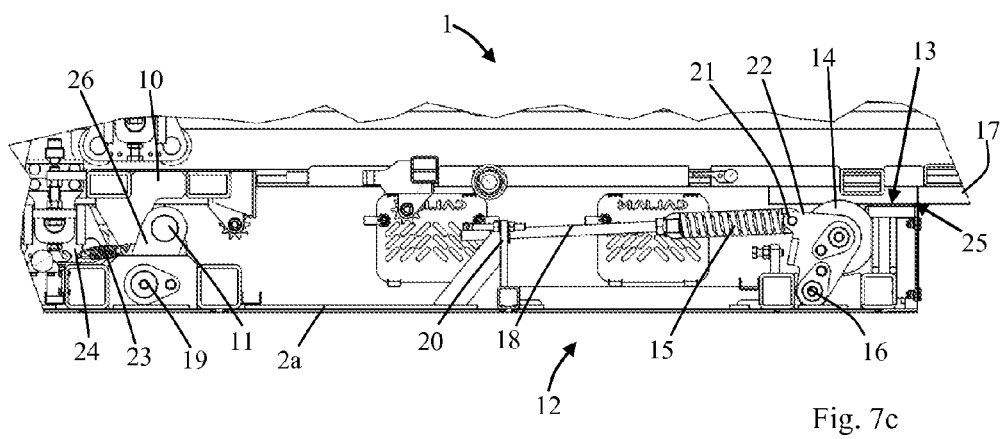
FIG. 7c illustrates the area B shown in FIG. 5, in a further sectional and enlarged view showing the example mechanically extendable base unit section approaching the fully extended position.

As illustrated in FIGS. 7a to 7c showing a further section view of area B of FIG. 5, the bolt 11 is spring-loaded by a spring 23. The spring 23 pulls bolt 11 into a rest position in which a U-shaped holder 26 holding bolt 11 is in an upright position. The bolt 11 rotates around axis 19 and thereby pulls the mechanically extendable base unit section 2b downwards, as will be explained in more detail in the following.

FIG. 7a illustrates the extendable conveyor 1 in a position where the mechanically extendable base unit section 2b is nearly to its fully extended position. The hook 10 is just engaging bolt 11, but does not push it out of the rest position. A small distance is present between bar 17 and bearing surface 13 (see region of arrow 25), since the extendable conveyor sections 3a-c are not fully extended.

In FIG. 7b the extendable base unit section 2b has moved further into the fully extended position and the hook 10 has pushed bolt 11 out of the rest position into a working position in the direction to the forward end of the base unit section 2a.

Thereby, the bolt 11 rotates with its holder 26 around axis 19, whereby bolt 11 is lowered. In FIG. 7b the distance between bar 17 and bearing surface 13 is still present (see arrow 25), as the extendable conveyor sections 3a-c are not fully extended.

The lowering of bolt 11 and rotation around axis 19 which is caused by the movement (e.g., of the last millimeter) of the mechanically extendable base unit section 2b in the fully extended position pulls hook 10 downwardly, (e.g. for few millimeters), such that the rearward end of the mechanically extendable base unit section 2b is also pulled downwards. The movement of the mechanically extendable base unit section 2b is allowed due to mechanical tolerances in the bearings configured to hold and/or move the mechanically extendable base unit section 2b. A bearing 24 at the extendable base unit section 2b which carries loads which act in a direction upwardly is balanced, since the bolt 11 pulls hook 10 together with bearing 24 mounted to it downwardly and thereby at least decreases the load acting on bearing 24 and acting in an upward direction. Moreover, the hook 10 can have a stiff connection with the bearing 24 in some examples, such that the downward movement of the hook 10, which is caused by the bolt 11 as discussed above, also move the bearing 24 directly downwards.

FIG. 7c shows that after the extendable conveyor sections 3a-c are at least partially extended, the forward end of the extendable base unit section 2b is such lowered that the bar 17 rests on the bearing surface 13.

FIGS. 8a to 8e illustrate the different extension states of an extendable conveyor 1 according to an example disclosed herein, where in this configuration at first the mechanically extendable base unit section 2b is fully extended before the extension of the extendable conveyor sections 3a-c starts (or the extension of the extendable conveyor sections 3a-c starts as long as the mechanically extendable base unit section 2b is in its fully nested position).

In FIG. 8a the extendable conveyor 1 is in a fully retracted position. FIG. 8b illustrates a partial extension of the extendable base unit section 2b. As mentioned, in this position, the extendable base unit section 2b is supported by the dynamic bearing 12 and does not touch the fixed bearing surface 13.

The full extended position of the extendable base unit section 2b is illustrated in FIG. 8c. In this position the extendable base unit section 2b lands and/or rests with bar 17 onto the fixed bearing surface 13. As mentioned, in other examples the extendable base unit section 2b might land only on the fixed bearing surface 13 when the extendable conveyor sections 3a-c are at least partially extended.

As is illustrated in FIG. 8c, the extendable conveyor sections 3a-c are still in their fully retracted position, when the extendable base unit section 2b reaches the fully extended position.

FIG. 8d illustrates the telescopic extension of the extendable conveyor sections 3a-c. As mentioned, in some examples the extendable base unit section 2b lands with the bar 17 onto the bearing surface 13 (e.g. when the extendable conveyor sections 3a-c are partially extended as it is the case in FIG. 8d). In FIG. 8e, the extendable conveyor 1 is in the fully extended position.

Figure 9:
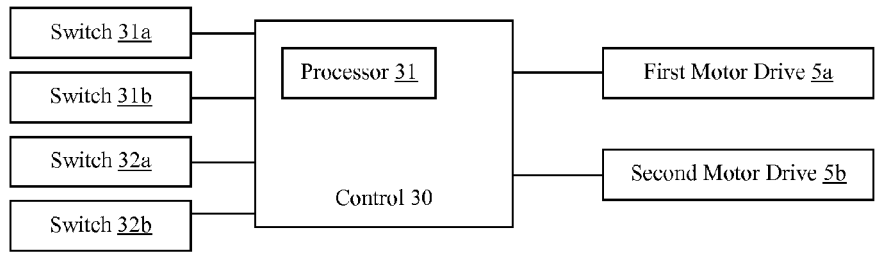
FIG. 9 is a schematic illustration of an example controller for controlling the example extendable conveyors disclosed herein.

FIG. 9 illustrates a controller 30 for controlling the first motor drive 5a and the second motor drive 5b. The controller 30 has a microprocessor 31 which is programmed such that it firstly drives first motor drive 5a until the extendable base unit section 2b is in the fully extended position and then the controller 30 drives the second motor drive 5b until the extendable conveyor sections 3a-c are in the fully extended position. The controller 30 can be connected with a terminal which can be controlled by personnel.

In some examples, the controller 30 can be connected with proximity or limit switches 32a, 32b, 33a, 33b which issue or generate a signal to the controller 30 such that the controller 30 can turn off the first and second motor drive 5a and 5b, respectively, in the case that: i) the extendable base unit section 2b is in the fully retracted position (switch 32a), ii) the extendable base unit section 2b is in the fully extended position (switch 32a); iii) the extendable conveyor sections 3a-c are in the fully retracted position (switch 33a), and/or iv) the extendable conveyor sections 3a-c are in the fully extended position (switch 33b).

Figure 10A:
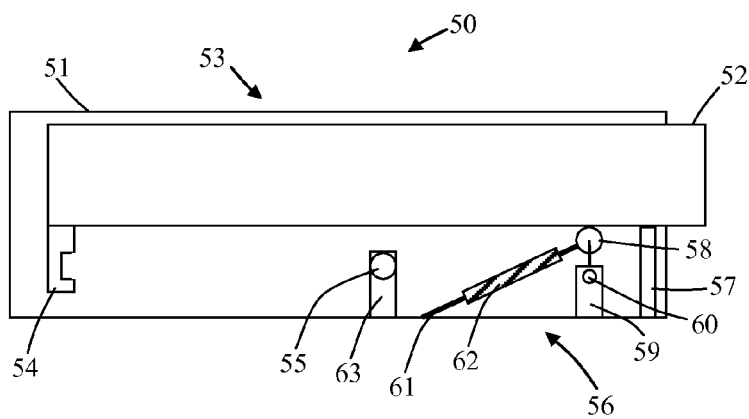
FIG. 10a illustrates yet another example extendable conveyor constructed in accordance with the teachings disclosed herein shown in a retracted position.
Figure 10B:
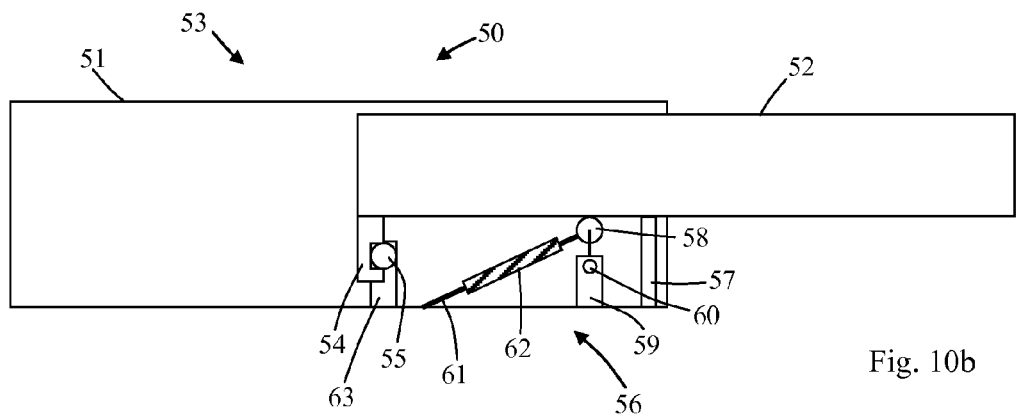
FIG. 10b illustrates the example extendable conveyor of FIG. 10a in a fully extended position.

An alternative example extendable conveyor 50 for conveying articles is illustrated in FIGS. 10a and 10b.

A difference between the conveyor 50 and the extendable conveyor 1 discussed above is that the extendable conveyor 50 has a base unit 51 which is not sectioned into two parts and that the extendable conveyor 50 has (e.g., at least) one extendable conveyor section 51, which is not necessarily independent extendable from other extendable sections. However the discussion of all other features discussed above in relation with the extendable conveyor 1 also apply for the extendable conveyor 50 of the alternative embodiment.

The base unit 51 and the extendable conveyor section 52 form together a conveying surface 53 for conveying articles.

The (at least one) extendable conveyor section 52 can be extended via a motor drive and chains (e.g., for example, as shown in EP 1 568 627 B1, the content of which is incorporated herein by reference in its entirety).

The extendable conveyor 50 has a dynamic bearing 56, such as dynamic bearing 12 discussed above, a hook 54 which engages a bolt 55, such as hook 10 and bolt 11 discussed above, and it has a fixed bearing surface 57, such as fixed bearing surface 13 discussed above.

The hook 54 is mounted at the bottom of the extendable conveyor section 52 and the respective bolt 55 is mounted via a holder 63 to the bottom of the base unit 51.

The dynamic bearing 56 has a wheel 58 which is pivotable coupled at a rotation axis 60 to a wheel holder 59. A bar 61, mounted to the bottom of base unit 51, having a spring 62 exerts a pulling spring-load onto wheel 58, such that wheel 58 pushes against the underside of the extendable conveyor section 52. As mentioned above, in some examples instead of or in addition to spring 62 one or more hydraulic cylinders can be provided.

The fixed bearing surface 57 is mounted at the forward end of the base unit 51.

As also discussed above in connection with the extendable conveyor 1, the hook 54 is located in a rearward end area of the base unit 51 when the extendable conveyor section 52 is in its fully retracted position (FIG. 10a).

During movement of the extendable conveyor section 52 from its retracted position in its fully extended position, the dynamic bearing 56 pushes the extendable conveyor section 52 upward and wheel 58 revolves on the underside of the extendable conveyor section 52. During this movement, the extendable conveyor section 52 does not touch the fixed bearing surface 57, since the dynamic bearing 56 is in its supporting position.

When the extendable conveyor section 52 is in its fully extended position, the exerted cantilever force on the dynamic bearing 56 exceeds the spring force of spring 62 such that the extendable conveyor section 52 moves downwardly and touches and rests on the bearing surface 57.

Also hook 54 engages into bolt 55, when the extendable conveyor section 52 is in its fully extended position, such that a lift of the extendable conveyors section 52 in the area of the hook 54 is avoided, which might happen due to the cantilever force exerted by the (at least one) extendable conveyor section 52 in its fully extended position and resting on the fixed bearing surface 57.

Hence, the cantilever forces and/or weight forces exerted by the extendable conveyor section 52 are distributed over the hook 54, the bolt 56 and the fixed bearing surface 57.

In the following, further alternative examples of an extendable conveyor for conveying articles are discussed with reference to FIGS. 11a to 13b. In the following examples, further mechanisms for fixating and supporting a mechanically extendable base unit/conveyor section of extendable conveyors discussed above are described as an example only. The skilled person will appreciate that, generally, the following mechanisms can be applied to all examples of extendable conveyors and to all sections of the extendable conveyors discussed herein.

Figure 11A:
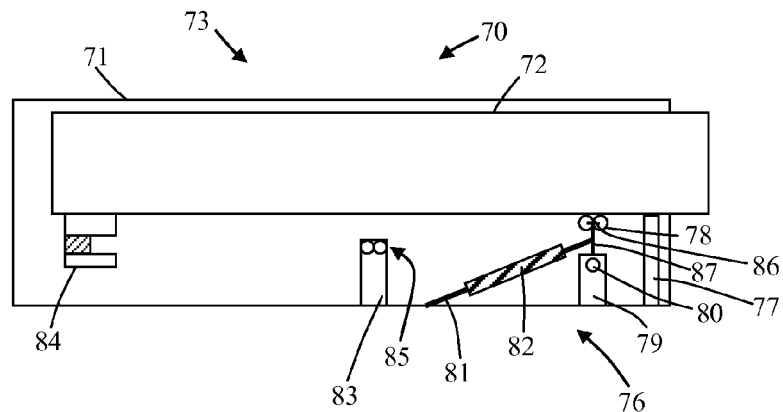
FIG. 11a illustrates an example extendable conveyor disclosed herein shown in a retracted position with an example dynamic bearing having two wheels and a hook engaging into an anchor structure having two wheels.
Figure 11B:
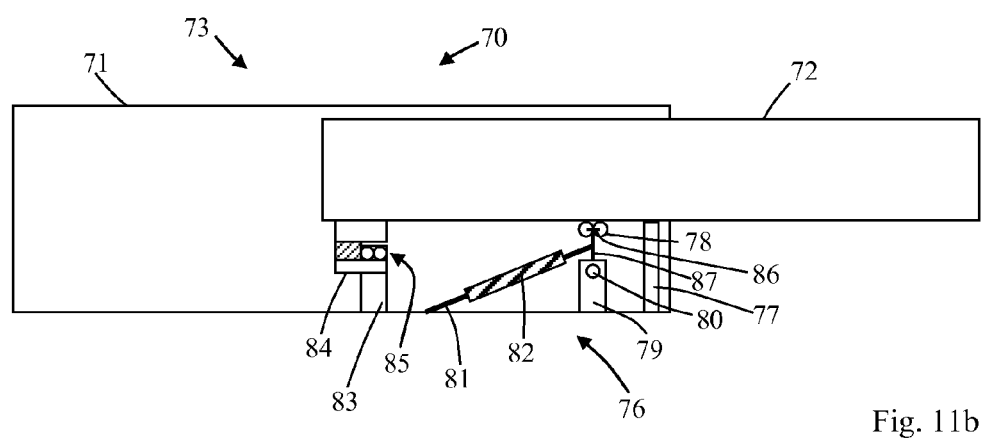
FIG. 11b illustrates the example extendable conveyor of FIG. 11a in a fully extended position.

In the embodiment of an extendable conveyor 70, as illustrated in FIGS. 11a and 11b, a base unit 71 and an extendable conveyor section 72 form together a conveying surface 73 for conveying articles.

The (at least one) extendable conveyor section 72 can be extended via a motor drive and chains.

The extendable conveyor 70 has a dynamic bearing 76, similar to dynamic bearing 12 or 56 discussed above, and it has a bearing surface 77, such as bearing surfaces 57 and 13 discussed above. In order to avoid repetitions, for the functionality of dynamic bearing 76 and the bearing surface 77 it is also referred to the above description of the dynamic bearings 12 and 56 and the bearing surfaces 13 and 57.

The dynamic bearing 76 has two wheels 78 which are pivotable coupled two a bar 86, which in turn is pivotable coupled to a vertical bar 87. The vertical bar 87 is pivotable coupled to a wheel holder 79, such that it can rotate around a rotation axis 80. A bar 81, mounted to the bottom of base unit 61 and to the vertical bar 87, having a spring 72 exerts a pulling spring-load onto wheels 78, such that wheels 78 push against the underside of the extendable conveyor section 72. As mentioned above, in some examples instead of or in addition to spring 72 one or more hydraulic cylinders can be provided.

A modified hook 84 (second anchor structure) is mounted at the bottom and rearward end of the extendable conveyor section 72 and it is adapted to engage into two wheels 85 mounted at a wheel holder 83 which is in turn mounted to the bottom of base unit 71.

The hook 84 is located in a rearward end area of the base unit 71 when the extendable conveyor section 72 is in its fully retracted position (FIG. 11a).

During movement of the extendable conveyor section 72 from its retracted position in its fully extended position (FIG. 11b), the dynamic bearing 76 pushes the extendable conveyor section 72 upward and wheels 78 revolve on the underside of the extendable conveyor section 72. During this movement, the extendable conveyor section 72 does not touch the fixed bearing surface 77, since the dynamic bearing 76 is in its supporting position.

When the extendable conveyor section 72 is in the fully extended position, the hook 84 engages wheels 85 (second anchor structure) such that a lower part of hook 84 pushes from the underside below wheels 85 against wheels 85. Hence, a lift of the extendable conveyors section 72 in the area of the hook 84 is avoided, which might happen due to the cantilever force exerted by the (e.g., at least one) extendable conveyor section 72 in its fully extended position and resting on the fixed bearing surface 77.

In the fully extended position the exerted cantilever force on the dynamic bearing 76 exceeds the spring force of spring 82 such that the extendable conveyor section 72 moves downwardly and touches and rests on the bearing surface 77.

Hence, the cantilever forces and/or weight forces exerted by the extendable conveyor section 72 in its fully extended position are distributed over the hook 84, the wheels 85 and the fixed bearing surface 77.

Figure 12A:
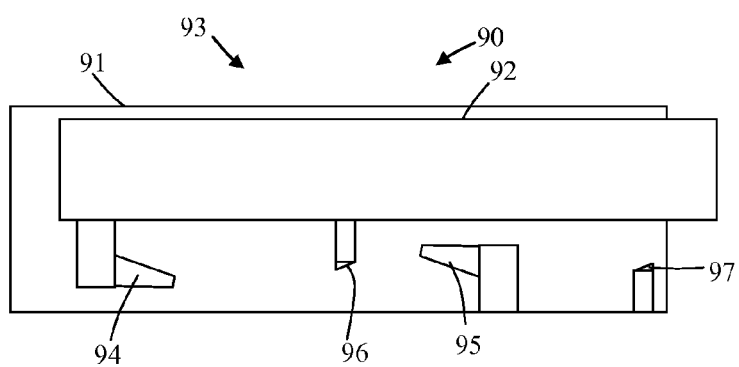
FIG. 12a illustrates another example extendable conveyor constructed in accordance with the teachings disclosed herein shown in a retracted position with two couples of wedge-shaped structures for supporting an example extendable conveyor section.
Figure 12B:
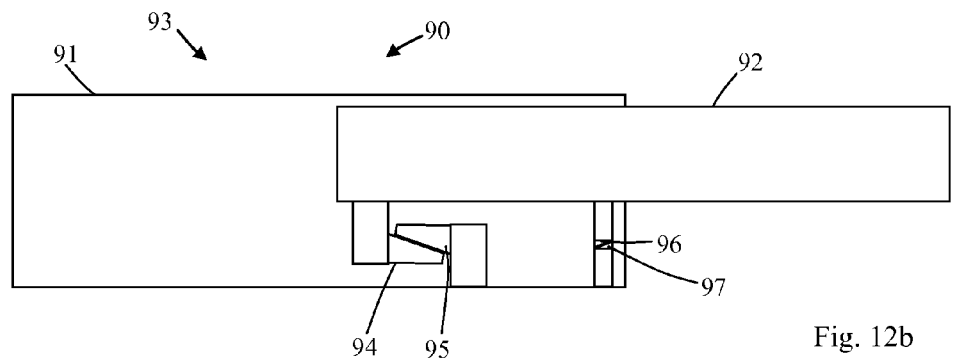
FIG. 12b illustrates the example extendable conveyor of FIG. 12a in a fully extended position.

FIGS. 12a and 12b illustrate another embodiment of an extendable conveyor 90. The extendable conveyor 90 has a base unit 91 and (e.g., at least one) extendable conveyor section 92 forming together a conveying surface 93 for conveying articles.

The (e.g., at least one) extendable conveyor section 92 can be extended via a motor drive and chains.

The extendable conveyor 92 has four wedge-shaped parts which can engage each other.

A first couple of two wedge-shaped parts includes a first rearward wedge part 94 (e.g., a second anchor structure) mounted in a reward area at the underside of the at extendable conveyor section 92 and a second wedge part 95 (e.g., a first anchor structure) mounted at the bottom of the base unit 91 and located in a forward area of the base unit 91. A second couple of two wedge shaped parts includes a third forward wedge part 97 (bearing surface) mounted to the bottom of the base unit 91 in a forward area and a corresponding fourth wedge part 96 mounted at the underside of the extendable conveyor section 92 in a rearward area.

In the fully retracted position, as shown in FIG. 12a, of the (e.g., at least one) mechanically extendable conveyor section 92 the first rearward wedge part 94 is located in the rearward area of the base unit 91. The first rearward wedge part 94 has an inclined surface on the upper side which runs downwardly in the forward direction. The second wedge part 95 has an underside which has an inclined surface which also runs downwardly in the forward direction. Hence, when the extendable conveyor section 92 is in its fully extended position, as shown in FIG. 12b, the first rearward wedge part 94 engages the second wedge part 95 such that both inclined surfaces touch each other. Thereby, also the mechanically extendable conveyor section 92 is lowered.

Similarly, the third forward wedge part 97 has an inclined upper side surface rising in the forward direction and the fourth wedge part 96 has a similar underside inclined surface rising in the forward direction. When the extendable conveyor section 92 is in the fully extended position, both inclined surfaces of the third 97 and fourth wedge part 96 touch each other and the third wedge part 97 pushes the fourth wedge part 96 upwardly.

Hence, a lift of the extendable conveyors section 92 in the area of the second wedge part 95 and the first wedge part 94 engaging each other is avoided, which might happen due to the cantilever force exerted by the (e.g., at least one) extendable conveyor section 92 in its fully extended position and resting on the fixed wedge part 97.

The third wedge part 97 has the function of a bearing surface, such as bearing surfaces 77, 57 and 13 discussed above.

The cantilever forces and/or weight forces exerted by the extendable conveyor section 92 are distributed over the two couples of wedge parts.

Figure 13A:
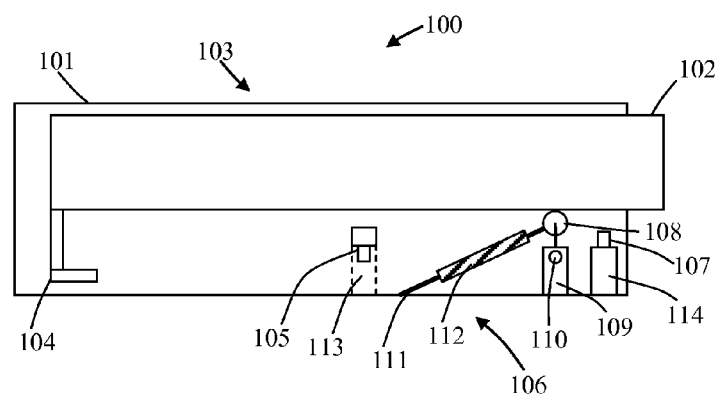
FIG. 13a illustrates another example extendable conveyor in accordance with the teachings disclosed herein shown in a retracted position having hydraulic members for supporting an extendable conveyor section.
Figure 13B:
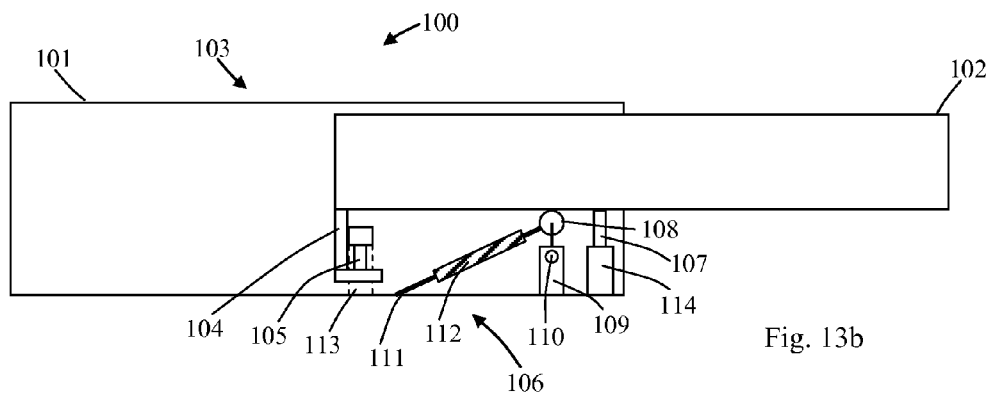
FIG. 13b illustrates the example extendable conveyor of FIG. 13a in a fully extended position.

FIGS. 13 and 13b illustrate another embodiment of an extendable conveyor 100. The extendable conveyor 100 has a base unit 101 and (at least one) mechanically extendable conveyor section 102 forming together a conveying surface 103 for conveying articles.

The (e.g., at least one) extendable conveyor section 102 can be extended via a motor drive and chains.

The extendable conveyor 100 has a dynamic bearing 106. The dynamic bearing 106 has a wheel 108 which is pivotable coupled at a rotation axis 110 to a wheel holder 109. A bar 111, mounted to the bottom of base unit 101, having a spring 112 exerts a pulling spring-load onto wheel 108, such that wheel 108 pushes against the underside of the extendable conveyor section 102. As mentioned above, in some examples instead of and/or in addition to spring 112 one or more hydraulic cylinders can be provided.

A hook 104 (e.g., a second anchor structure) is mounted at the rearward edge of the (e.g., at least one) mechanically extendable conveyor section 102 and hook 104 is located in a rearward are of base unit 101 when the extendable conveyor section 102 is in its fully retracted position (FIG. 13a).

When the extendable conveyor section 102 is in the fully extended position, the hook 104 is located at a position where a hydraulic fixation member 105 (e.g., a first anchor structure) is located. The hydraulic fixation member 105 is mounted via a holder 113 to the bottom of base unit 101.

When the extendable conveyor section 102 is in the fully extended position, the hydraulic fixation member 105 is extended downwardly such that it pushes onto an upper surface of hook 104 (see FIG. 13b). Thereby, hook 104 and the extendable conveyor section 102 to which hook 104 is mounted, are pushed in a downward direction as far as the mechanical tolerance allows.

A hydraulic bearing member 107 is mounted via a holder 114 in a forward area of the base unit 101. When the extendable conveyor section 102 is in the fully extended position, the hydraulic bearing member 107 is extended such that pushes against the underside of the extendable conveyor section 102. Hence, the hydraulic bearing member 107 has the function of the bearing surface discussed above. The underside of the extendable conveyor section 102 can be reinforced in the area where the hydraulic bearing member 107 pushes against the underside.

Hence, a lift of the extendable conveyors section 102 in the area of hook 104 pushed downwardly by the hydraulic fixation member 105 is avoided, which might happen due to the cantilever force exerted by the (e.g., at least one) extendable conveyor section 102 in its fully extended position and resting on the hydraulic bearing member 107.

The cantilever forces and/or weight forces exerted by the extendable conveyor section 102 are distributed over hook 104, the hydraulic fixation member 105 and the hydraulic bearing member 107.

In the examples above, only one hook/bolt connection, one bearing surface and one dynamic bearing per extendable conveyor have been discussed. However, the teachings disclosed herein are not limited to a specific number of a hook/bolt connection, bearing surface and the dynamic bearing, but multiple hook/bolt connections, bearing surfaces and/or dynamic bearings may be provided.

It is noted that this patent claims priority from European Patent Application Serial Number 13004266.6, which was filed on Aug. 29, 2013, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. An extendable conveyor to convey articles, the extendable conveyor comprising:
a base unit including a fixed base unit section positionable onto a ground and a mechanically extendable base unit section, the mechanically extendable base unit section being adjustably positionable incrementally between a fully nested position within the fixed base unit section and a fully extended position telescoped forwardly from the fixed base unit section;
a mechanically extendable conveyor section coupled to the mechanically extendable base unit section, wherein the mechanically extendable conveyor section is adjustably positionable incrementally between a fully nested position within the mechanically extendable base unit section and a fully extended position telescoped forwardly from the mechanically extendable base unit section; and
a conveying surface to convey articles extending at least partially on an upper side of the fixed base unit section, the mechanically extendable base unit section and the mechanically extendable conveyor section, wherein the mechanically extendable base unit section and the mechanically extendable conveyor section are configured such that extension of the mechanically extendable base unit section from the fixed base unit section is independent of an extension of the mechanically extendable conveyor section from the mechanically extendable base unit section.

2. The extendable conveyor of claim 1, wherein the mechanically extendable conveyor section comprises a first mechanically extendable conveyor section and a second mechanically extendable conveyor section, the first mechanically extendable conveyor section being an outmost mechanically extendable conveyor section, and the second mechanically extendable conveyor section being an intermediate mechanically conveyor section positionable between the mechanically extendable base unit section and the outmost mechanically extendable conveyor section, the first and second mechanically extendable conveyor sections being extendable independently from the mechanically extendable base unit section.

3. The extendable conveyor of claim 1, further comprising a first drive unit to extend the mechanically extendable base unit section relative to the fixed base unit section and a second drive unit to extend the mechanically extendable conveyor section.

4. The extendable conveyor of claim 3, wherein the first drive unit is located at the mechanically extendable base unit section and the second drive unit is located at the mechanically extendable conveyor section.

5. The extendable conveyor of claim 1, wherein the fixed base unit section comprises a support structure to support the mechanically extendable base unit section in the fully extended position.

6. The extendable conveyor of claim 5, wherein the support structure includes a fixed bearing surface to support the mechanically extendable base unit section in the fully extended position.

7. The extendable conveyor of claim 5, wherein the support structure further comprises a dynamic bearing to support the mechanically extendable base unit section at a plurality of positions of the mechanically extendable base unit section between the fully nested position within the fixed base unit section and the fully extended position telescoped forwardly from the fixed base unit section.

8. The extendable conveyor of claim 7, wherein the dynamic bearing provides a supporting function during movement of the mechanically extendable base unit section.

9. The extendable conveyor of claim 7, wherein the dynamic bearing is located adjacent to the fixed bearing surface.

10. The extendable conveyor of claim 7, wherein the support structure is configured to enable the dynamic bearing to move between a supporting position and a rest position.

11. The extendable conveyor of claim 10, wherein the dynamic bearing is in the rest position when the mechanically extendable conveyor section is in the fully extended position.

12. The extendable conveyor of claim 7, wherein the dynamic bearing is spring-loaded.

13. The extendable conveyor of claim 7, wherein the dynamic bearing comprises a supporting wheel.

14. The extendable conveyor of claim 5, wherein the support structure is further provided in at least one of the mechanically extendable base unit section or the mechanically extendable conveyor section.

15. The extendable conveyor of claim 14, wherein each of the mechanically extendable base unit section and the mechanically extendable conveyor section includes a drive unit where the support structure is provided.

16. The extendable conveyor of claim 1, wherein the fixed base unit section comprises a first anchor structure and the mechanically extendable base unit section comprises a second anchor structure, the first and second anchor structures engage each other when the mechanically extendable base unit section is in the fully extended position, and the first and second anchor structures are to receive cantilever forces exerted by the extended mechanically extendable conveyor section.

17. The extendable conveyor of claim 16, wherein the first and the second anchor structure define a rotation axis when in engagement with each other.

18. The extendable conveyor of claim 16, wherein the first anchor structure has a bolt-shaped portion and the second anchor structure has a hook-shaped portion.

19. The extendable conveyor of claim 16, wherein a downward force is to be exerted on a rearward end of the mechanically extendable base unit section by the first and second anchor structures after engagement of the first and second anchor structures.

20. The extendable conveyor of claim 16, wherein the cantilever forces are to be distributed between the fixed bearing surface and at least one of the first anchor structure or the second anchor structure.

21. The extendable conveyor of claim 16, wherein the first and second anchor structures are provided in the mechanically extendable base unit section and the mechanically extendable conveyor section adjacent the mechanically extendable base unit section.

22. The extendable conveyor of claim 1, further comprising a controller adapted to control the extendable conveyor such that the full extension of the mechanically extendable base unit section precedes the extension of the mechanically extendable conveyor section from the mechanically extendable base unit section.

23. An extendable conveyor to convey articles, the extendable conveyor comprising:
  a base unit and a mechanically extendable conveyor section coupled to the base unit, the mechanically extendable conveyor section being adjustably positionable incrementally between a fully nested position within the base unit and a fully extended position telescoped forwardly from the base unit;
  a conveying surface to convey articles extending at least partially on an upper side of the base unit and the mechanically extendable conveyor section; and
  a support structure to support the mechanically extendable conveyor section and to receive cantilever forces exerted to the base unit by the mechanically extendable conveyor section when the mechanically extendable conveyor section is in the fully extended position, the support structure including a fixed bearing surface to support the mechanically extendable conveyor section in the fully extended position and a dynamic bearing to support the mechanically extendable conveyor section at positions of the mechanically extendable conveyor section between the fully nested position within the base unit and the fully extended position telescoped forwardly from the base unit.

24. The extendable conveyor of claim 23, wherein the dynamic bearing provides a supporting function during movement of the mechanically extendable conveyor section.

25. The extendable conveyor of claim 23, wherein the dynamic bearing is located adjacent to the fixed bearing surface.

26. The extendable conveyor of claim 23, wherein the support structure is configured to enable the dynamic bearing to move between a supporting position and a rest position.

27. The extendable conveyor of claim 26, wherein the dynamic bearing is in the rest position when the mechanically extendable conveyor section is in the fully extended position.

28. The extendable conveyor of claim 23, wherein the dynamic bearing is spring-loaded.

29. The extendable conveyor of claim 23, wherein the dynamic bearing includes a supporting wheel.

30. The extendable conveyor of claim 23, wherein the base unit comprises a first anchor structure and the mechanically extendable conveyor section comprises a second anchor structure, wherein the first and second anchor structures engage each other when the mechanically extendable conveyor section is in the fully extended position, and the first and second anchor structures to receive cantilever forces exerted by the extended mechanically extendable conveyor section.

31. The extendable conveyor of claim 30, wherein the first anchor structure and the second anchor structure define a rotation axis when in engagement with each other, the first and second anchor structures to receive cantilever forces exerted by the extended mechanically extendable conveyor section.

32. The extendable conveyor of claim 30, wherein the first anchor structure has a bolt-shaped portion and the second anchor structure has a hook-shaped portion.

33. The extendable conveyor of claim 30, wherein the cantilever forces are distributed between the fixed bearing surface and the first or second anchor structure.

34. The extendable conveyor of claim 23, wherein the support structure is provided in at least two adjacent mechanically extendable conveyor sections.

35. The extendable conveyor of claim 30, wherein the first and second anchor structures are provided in at least two adjacent mechanically extendable conveyor sections.

* * * * *

UNITED STATES PATENT AND TRADEMARK OFFICE
CERTIFICATE OF CORRECTION

| | |
|---|---|
| PATENT NO. | : 9,315,328 B2 |
| APPLICATION NO. | : 14/465492 |
| DATED | : April 19, 2016 |
| INVENTOR(S) | : Anders Stougaard Baek |

Page 1 of 1

It is certified that error appears in the above-identified patent and that said Letters Patent is hereby corrected as shown below:

In the Claims (Claim 16) Column 21, line 22: between "structures" and "engage" add the word --to--.

Signed and Sealed this
Twenty-first Day of June, 2016

Michelle K. Lee
*Director of the United States Patent and Trademark Office*